United States Patent
Speer et al.

(10) Patent No.: US 6,953,514 B2
(45) Date of Patent: Oct. 11, 2005

(54) METHOD AND DEVICE FOR ASSEMBLING SUBSTRATES

(75) Inventors: Ulrich Speer, Eisingen (DE); Stephan Leonhardt, Bretten (DE)

(73) Assignee: Steag HamaTech AG (DE)

( * ) Notice: Subject to any disclaimer, the term of this patent is extended or adjusted under 35 U.S.C. 154(b) by 42 days.

(21) Appl. No.: 10/250,794

(22) PCT Filed: Dec. 13, 2001

(86) PCT No.: PCT/EP01/14660

§ 371 (c)(1),
(2), (4) Date: Jul. 8, 2003

(87) PCT Pub. No.: WO02/053357

PCT Pub. Date: Jul. 11, 2002

(65) Prior Publication Data

US 2004/0055701 A1 Mar. 25, 2004

(30) Foreign Application Priority Data

Jan. 8, 2001 (DE) ........................... 101 00 426

(51) Int. Cl.⁷ ............................................. B29C 65/00
(52) U.S. Cl. ..................................................... 156/285
(58) Field of Search ........................ 156/228, 285–286, 156/295, 381–382, 556, 580, 583.3; 100/211, 264, 269.01, 269.02, 269.03, 269.04, 270, 278, 295–296; 369/286; 428/64.2–65.9, 66.6, 692, 694 ML; 346/135.1, 137; 360/135; G11B 7/26, 7/24

(56) References Cited

U.S. PATENT DOCUMENTS

| 2,172,002 | A | * | 9/1939 | Stanley | .................. 100/48 |
|---|---|---|---|---|---|
| 2,859,796 | A | | 11/1958 | Taunton | |
| 3,383,265 | A | | 5/1968 | Grabedian | |
| 5,261,997 | A | * | 11/1993 | Inselmann | .................. 156/556 |
| 5,582,677 | A | | 12/1996 | Miwa et al. | |
| 5,967,030 | A | * | 10/1999 | Blalock | .................. 100/211 |
| 6,110,321 | A | | 8/2000 | Day et al. | |

FOREIGN PATENT DOCUMENTS

| DE | 33 00 622 | 7/1984 |
|---|---|---|
| DE | 39 35 562 | 5/1991 |
| DE | 42 33 622 | 4/1994 |
| DE | 197 15 779 | 10/1998 |
| DE | 19927516.5 | 6/1999 |
| DE | 199 27 514 | 12/2000 |
| DE | 100 29 400 | 1/2001 |
| EP | 0528566 | 2/1993 |
| WO | WO 97/36738 | 10/1997 |
| WO | WO 00/76752 | 12/2000 |

* cited by examiner

Primary Examiner—Jessica L. Rossi
(74) Attorney, Agent, or Firm—Robert W. Becker & Associates; Robert W Becker

(57) ABSTRACT

A method and apparatus for joining at least two substrates together, especially to form an optical data carrier, are provided. Substrates are disposed in a spaced-apart manner between two plates that are disposed opposite from, and are movable relative to, one another. At least one of the plates is connected to a flexible membrane. At least the plate to which the flexible membrane is connected is moved in such a way that a pressure difference is produced on opposite sides of the membrane.

7 Claims, 2 Drawing Sheets

METHOD AND DEVICE FOR ASSEMBLING SUBSTRATES

BACKGROUND OF THE INVENTION

The present invention relates to a method and an-apparatus for joining at least two substrates together, especially for forming an optical data carrier, according to which the substrates are disposed in a spaced-apart state between two oppositely disposed plates that are movable toward one another.

An apparatus of this type is known, for example, from the not pre-published DE 199 27 516.5 that originates with the same applicant. With the known apparatus, a double-sided adhesive foil or film is first applied to a first substrate. Subsequently, the substrate, with the adhesive film facing upwardly, is placed upon a first plate. Provided on the first plate is a centering pin, that is introduced into an inner hole of the substrate and centers it. Subsequently, a second substrate is positioned over the first substrate and, by suitable noses of the centering pin, is held parallel to and spaced above the first substrate. Subsequently, a closed chamber is formed about the substrate and is supplied with underpressure. When a desired pressure is achieved, a pressure ram disposed in the chamber is moved downwardly in order to press the two substrates together and glue them to one another.

After the pressing together, the adhesive film disposed between the substrates is cured in a suitable manner.

With this apparatus there results the problem that the support plate and the pressure ram must be parallel to one another in order to uniformly join the two substrates together, which significantly increases the complexity and the cost for the apparatus.

Proceeding from the aforementioned state of the art, it is therefore an object of the present invention to provide a method and an apparatus for joining substrates together according to which the uniform joining of the substrates together is possible in a straightforward and economical manner.

SUMMARY OF THE INVENTION

Pursuant to the invention, this object is realized with a method for joining at least two substrates together, especially for forming an optical data carrier, according to which the substrates are disposed spaced apart between two oppositely disposed plates that are movable relative to one another, in that at least one of the plates, which is connected with a flexible membrane, is moved in such a way that a pressure difference is produced on opposite sides of the membrane. By mounting one of the plates on a flexible membrane, there results a floating mounting of the plate, which during the joining of the substrates together enables a good and uniform conformation of the two plates relative to one another. This ensures a uniform pressing together of the substrates. Furthermore, by producing a relatively small pressure difference on opposite sides of the membrane, a high pressure can be achieved.

Pursuant to one preferred embodiment of the invention, the pressure difference is achieved by applying an underpressure in a first chamber that surrounds the plates, whereby one wall of the chamber is formed at least partially by the membrane. By producing the underpressure in the first chamber that surrounds the plates, on the one hand the required pressure difference is produced, and on the other hand the joining of the substrates together is effected under underpressure conditions that considerably reduce the risk of air bubbles between the substrates.

An underpressure is preferably applied in a second chamber, which is disposed on a side of the membrane that faces away from the plates, in order to initially keep the membrane, and the plate mounted thereon, spaced from the other plate. In this connection, prior to the joining of the substrates together the pressure in the second chamber is preferably kept below the pressure in the first chamber in order to prevent the plates from prematurely moving toward one another in an uncontrolled manner. Pursuant to one preferred embodiment of the invention, the pressure in the second chamber is brought to ambient pressure for the joining of the substrates together, while the pressure in the first chamber is kept at an underpressure. The pressure in the second chamber can be brought to ambient pressure in a controlled manner, as a result of which a movement of the two plates toward one another is controlled. This ensures a uniform joining of the substrates together.

After the joining of the substrates together, the first chamber is preferably supplied with pressure to separate the plates from one another. The pressure in the first chamber furthermore effects a curing or hardening of an adhesive disposed between the substrates.

Pursuant to a particularly preferred embodiment of the invention, prior to being joined together the substrates are held spaced from one another by a centering pin that engages in an inner hole of the substrates, as a result of which on the one hand, a centering of the substrates relative to one another is provided, and also an undesired and uncontrolled joining of the substrates together is prevented.

The object of the present invention is also realized with an apparatus for joining at least two substrates together, especially for forming an optical data carrier, and includes two oppositely disposed plates that are movable relative to one another for pressing the substrates together, and that at least one of the plates is connected with a flexible membrane, and a device is provided for producing a pressure difference on opposite sides of the membrane. By connecting one of the plates with a flexible membrane, there results the already above described advantages that the plate is floatingly mounted and thus a good conformation is possible to the other plate. Furthermore, by producing a slight pressure difference on opposite sides of the membrane, a good pressure can be achieved since the pressure difference acts on a relatively large surface comprised of plate and membrane.

A first, essentially closed chamber is preferably formed on a first side of the membrane in order to be able to produce a pressure difference on the opposite sides of the membrane. Pursuant to the preferred embodiment of the invention, a second, essentially closed chamber is preferably provided on a second side of the membrane in order to ensure a good controllability of the pressure difference.

At least one vacuum source is advantageously provided that can be connected with the first and/or second chamber.

The vacuum source is in a position to produce the desired pressure difference, as well as to enable a joining of the substrates together in a low-pressure atmosphere, as a result of which air bubbles between the substrates are avoided.

Pursuant to the preferred embodiment of the invention, at least one pressure source is furthermore provided that can be connected with the first and/or second chamber in order to produce the desired pressure difference, or in order to hold the substrates in a pressure atmosphere after the joining together and to cure an adhesive disposed between the substrates.

The plates are preferably disposed together in one of the chambers. To limit the movement of the membrane and the plate in a direction away from the other plate, a support or abutment means is preferably provided on that side of the membrane that faces away from the plates. As a result of the movement limitation, the service life of the membrane can be considerably prolonged, since a deflection is essentially effected in only one direction.

For a good and uniform loading of the membrane, and a good conformation of the plates relative to one another, they are preferably disposed essentially horizontally. In this connection, the plate that is mounted on the membrane is advantageously disposed above the other plate. This arrangement makes it possible that a single plate mounted on a membrane cooperates with a plurality of plates that are provided, for example, on a rotary switching or indexing table. In this way, the throughput of the apparatus is increased while at the same time reducing costs. By using the same membrane, successive, uniform processing results can furthermore be produced. In this connection, the membrane is preloaded upwardly against a support or abutment means by an elastic element, especially a spring.

Preferably provided on one of the plates is a centering pin that can be introduced into an inner hole of the substrates in order to center them relative to one another during the joining together. To ensure a controlled joining of the substrates together, the centering pin preferably keeps the substrates spaced apart and essentially parallel to one another prior to the substrates being joined together.

The inventive method and the apparatus are particularly suitable for optical recording media, such as CD's, DVD's, etc., where two substrates are glued together to form the data carrier. It is, of course, also possible to join a plurality of substrates together in the aforementioned manner. The inventive method and the apparatus are preferably used in combination with an apparatus according to which prior to the joining of the substrates together, a double-sided adhesive foil or film is applied to one of the substrates, as is known, for example, from the not pre-published DE 199 27 516.5, which originates from the same applicant and which in this connection is made the subject matter of the present invention in order to avoid repetition.

The invention will be described in greater detail subsequently with the aid of preferred embodiments with reference to the figures. Shown are:

DESCRIPTION OF PREFERRED EMBODIMENTS

Figure 1:
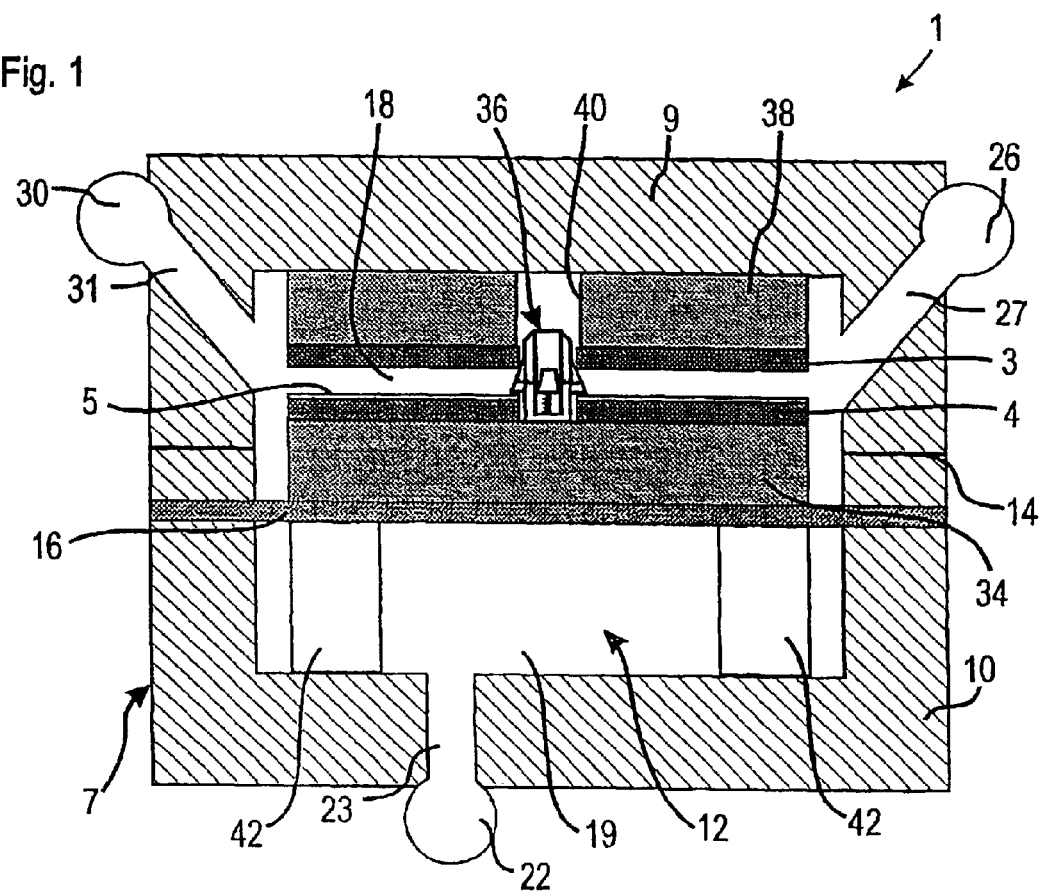
FIG. 1 a schematic cross-sectional view through one apparatus, for the joining of substrates together, in a first position prior to the joining of the substrates together.

FIG. 1 shows an apparatus 1 for the joining together of two substrates 3, 4, which have an inner hole and form, for example, a CD or DVD or some other data carrier. FIG. 1 shows the apparatus in a position prior to the joining of the substrates 3,4 together. In order, during the joining of the substrates 3,4 together, to ensure a gluing together thereof, as can be seen in FIG. 1 an adhesive 5 in the form of a double-sided adhesive foil or film is applied to the substrate 4. The double-sided adhesive film, as well as an appropriate device for applying the adhesive film, is known, for example, from the not pre-published DE 199 27 516.5, which originates with this same applicant and which to this extent is made the subject matter of the present invention in order to avoid repetition.

The apparatus 1 has a housing 7, which is formed from two housing portions 9, 10 that are movable relative to one another and which each have an essentially U-shaped cross-section. In a moved-together state, the two housing portions 9,10 form a chamber 12 between them. The chamber 12 is sealed relative to the surroundings at the interface 14 between the two housing portions 9,10.

In the housing portion 10, which pursuant to FIG. 1 represents the lower housing portion, there is provided a flexible membrane 16 of synthetic or plastic material that completely spans the inner region of the housing portion 10 and as a result divides the chamber 12 that is formed between the housing portions 9,10 into an upper chamber portion 18 and a lower chamber portion 19. Of course, the membrane 16 can also be made of some other suitable material, such as, for example, metal. The lower chamber portion 19 can be supplied with underpressure via a vacuum source 22, such as a vacuum pump, and an appropriate conduit 23 in the housing portion 10, as will be described in greater detail subsequently. In the same manner, the upper chamber portion 18 can be supplied with underpressure via a vacuum source 26 and an appropriate conduit 27 in the upper housing portion 9. The upper chamber portion 18 can furthermore be supplied with pressure via a pressure source 30, such as a pump, and an appropriate conduit 31 in the upper housing portion 9. The function of the vacuum sources as well as of the pressure source will be described in greater detail subsequently.

Mounted in a suitable manner to the membrane 16 is a plate 34 that faces the upper chamber portion 18, so that the plate 34 is movable with the flexible membrane 16. The plate 34 can, for example, be glued to the membrane 16, or the plate 34, and a non-illustrated clamping or retaining ring, can clamp the membrane 16 between them. Provided on the plate 34 is a centering pin 36 that will be described in greater detail subsequently with reference to FIG. 3.

Figure 2:
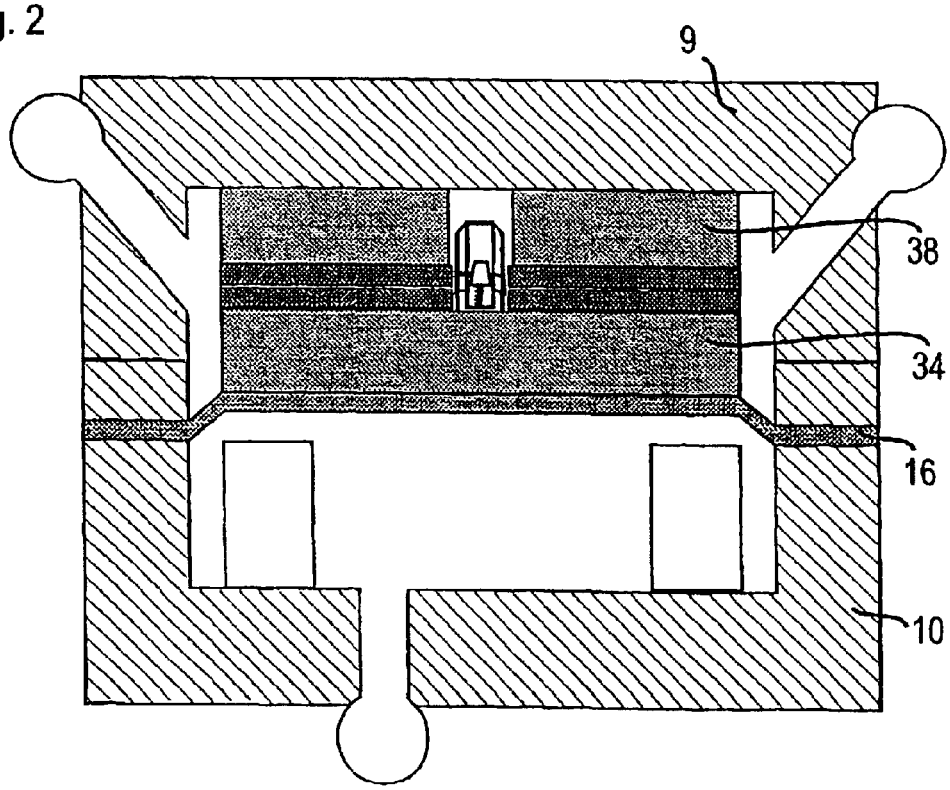
FIG. 2 a schematic cross-sectional view through the apparatus of FIG. 1 in a second position during the joining of the substrates together.

Provided on the upper housing portion 9 is a plate 38 that is disposed opposite to the plate 34. The plate 38 has a central opening 40 into which the centering pin 36 is movable during a movement of the lower plate 34 toward the upper plate 38, as illustrated in FIG. 2.

The plates 34 and 38 have a geometry that is adapted to the substrates. In FIG. 1, the plate 38 is illustrated as a separate component that is mounted on the housing portion 9. Of course, the plate can also be integrally or monolithically formed with the housing portion 9, or the inner wall of the inner housing 9 can serve as a plate or cooperating surface for the lower plate 34, so that an additional plate, such as the plate 38, is eliminated.

Provided in the lower chamber portion 19 are two abutment or support means 42 that are essentially disposed below the plate 34. The support means limit a movement of the membrane 16 and the lower plate 34 in a downwardly directed direction, as a result of which the membrane 16 essentially deflects only upwardly, which prolongs its service life. Instead of two support means, it is, of course, also possible to provide only one support means 42, preferably centrally arranged. The support means can also be arranged in such a way that they do not overlap regions of the membrane 16 that are covered by the plate 34 in order to absorb the forces that act upon the membrane 16 in this region.

The construction of the centering pin 36 will be described in greater detail with reference to FIG. 3. The construction of the centering pin is described in greater detail in the not pre-published DE 199 27 514.9, which originates with the applicant and which to this extent is made the subject matter of the present invention in order to avoid repetition. The centering pin 36 has an upwardly open hollow space 45 that is limited to the side by a circumferential side wall 47 and toward the bottom by a base 48 of the pin 36. The outer periphery of the wall 47 is adapted to the shape of the inner holes of the substrates 3,4, and in particular in a lower region the pin has a precisely ground outer periphery in order to ensure a good centering and guidance of the two substrates 3,4. The upper end of the wall 47 is chamfered, so that it defines an upwardly tapering bevel 49. The bevel 49 enables a centering and guidance of the substrates as they are received upon the pin 36.

Figure 3:
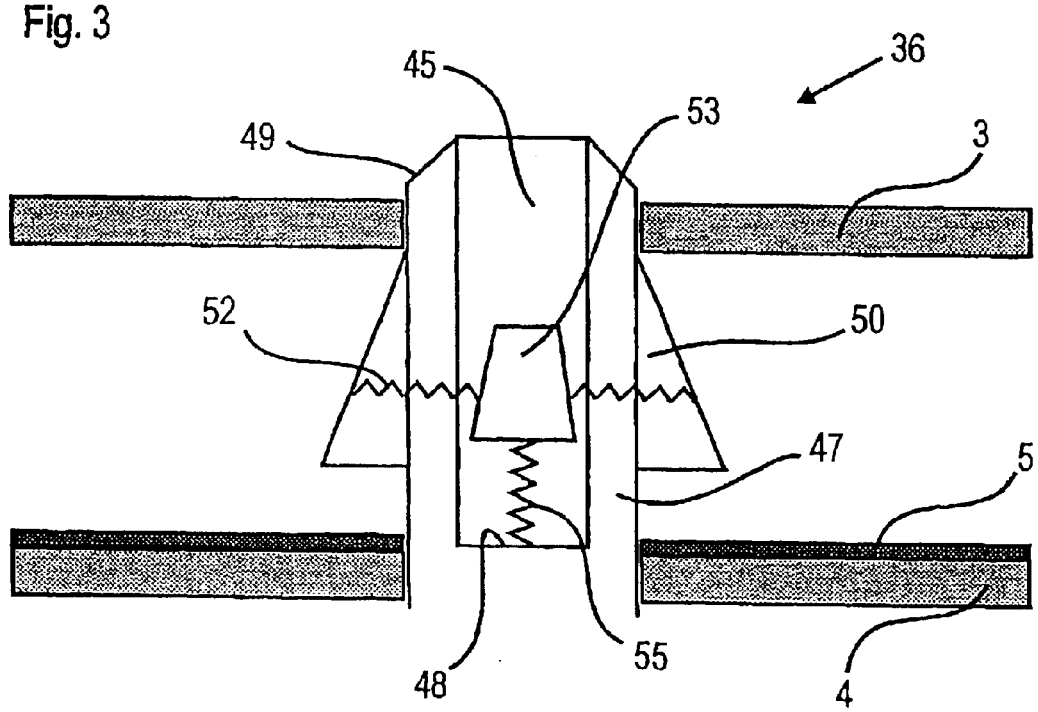
FIG. 3 a schematic illustration of a centering pin used in the apparatus of FIG. 1.

Mounted on the side wall 47 of the pin 36 is a plurality of movable noses 50, two of which are illustrated in FIG. 3. With the presently preferred embodiment four noses 50 are provided. The noses 50 are pivotably mounted in a suitable manner on the wall 47 of the pin 36 in order to enable a movement of the noses between the positions shown in FIGS. 1 and 2.

The noses 50 are preloaded by compression springs 52 radially outwardly away from the pin 36 into the position shown in FIG. 3, and are pivotable against this spring preload into the position shown in FIG. 2. Provided in the hollow space 45 of the pin 36 is a cone 53 that tapers upwardly and is movable within the hollow space 45. The cone 45 is preloaded upwardly by a spring 55 into the position shown in FIG. 3.

One end of the compression springs 52 is supported against the cone 53, and the other end thereof is supported against the noses 50 in order to press them outwardly. The springs 52 can slide along the conical surface of the cone 53 when the latter is pressed downwardly against the preload of the spring 55, as a result of which the outwardly directed preload force is varied.

The noses 50 have linear outer surfaces against which the substrates can slide downwardly, and which enable a precise guidance of the substrates. If a first substrate 4, with an adhesive layer 5 disposed thereon, is moved into the position shown in FIG. 3, a second substrate 3 can be placed upon the noses 50. Due to the fact that the noses 50 are preloaded radially outwardly, they hold the substrate 3 in the illustrated position, in which it is spaced relative to the first substrate 4. Due to the linear outer surfaces of the noses 50, the substrate 3 is held parallel to the substrate 4. If the substrate 3 is pressed in the direction of the substrate 4, or the substrate 4 is pressed toward the substrate 3, the noses 50 are pressed inwardly against the spring preload 52, as a result of which the substrate 3 can move in the direction of the substrate 4. During this movement, the substrate 3 is guided in a precisely centered manner toward the substrate 4 and is held parallel thereto.

With the illustrated centering pin, the substrates are held spaced apart by the noses prior to the substrates being joined together. This spaced apart holding or support can alternatively also be effected by radially outwardly preloaded spheres, spring washers, pins or similar devices that are in a position to hold the substrates spaced apart prior to their being joined together, and to hold them essentially parallel to one another.

The operation of the inventive apparatus 1 will now be explained in greater detail with the aid of FIGS. 1 and 2. To load the apparatus 1, the housing portions 9 and 10 are moved apart in order to enable a handling device to place the substrates 4 and 3 upon the plate 34 and the centering pin 36 respectively. In this connection, the substrate 4, with an adhesive layer 5 that is disposed thereon and faces upwardly, is placed directly upon the plate 34. The substrate 3 is subsequently placed upon the noses 50 of the centering pin 36 in such a way that the substrates 3, 4 are held spaced apart and parallel to one another.

The housing portions 9,10 are now moved together into the position shown in FIG. 1, so that the upper chamber 18 is sealed relative to the surroundings. In this connection, the upper plate 38 comes into engagement with an upwardly directed side of the substrate 3, whereby, however, the substrates 3,4 continue to be held spaced from one another by the centering pin 36. An underpressure is subsequently produced in the lower chamber 19 by the vacuum pump 22 and the conduit 23. At the same time, or subsequently, an underpressure is also produced in the upper chamber 18 by the vacuum pump 26 and the conduit 27. In so doing there is ensured that the pressure in the lower chamber 19 is less than the pressure in the upper chamber 18, so that the membrane is reliably drawn against the support means 42. As soon as a desired pressure is reached in the upper chamber 18, which pressure prevents air bubbles between the substrates, the pressure in the lower chamber 19 is raised in a controlled manner to ambient pressure. As a consequence of the thereby resulting pressure difference between the two chambers 18, 19, and the lower pressure in the upper chamber 18, the membrane 16, with the plate 34 mounted thereon, is moved upwardly in a controlled manner to the upper plate 38 into the position shown in FIG. 2. In this position, the substrates 3,4 are pressed uniformly together. Due to the floating mounting of the plate 34, there results a good conformation of the plate 34 to the upper plate 38 so that a uniform compressive force is applied over the substrates.

The underpressure in the upper chamber is subsequently also raised to ambient pressure, so that the membrane 16 with the plate 34 is again moved downwardly. The two joined-together substrates move with the plate 34 and are released from the plate 38. The membrane 16 comes to rest against the support means 42, which prevent the membrane from sagging downwardly.

The pressure in the upper chamber 18 is now brought to an overpressure by the pump 30 and the conduit 31 in order to accelerate the bonding or curing process of the adhesive 5 disposed between the substrates 3,4. Alternatively, the adhesive can also be cured in the apparatus 1 by other methods, such as, for example, a UV irradiation or the like. Of course, the adhesive can also be cured in a separate curing station.

For the removal of the substrates 3,4 that have been joined together in this fashion, the lower and upper housing portions 9,10 are moved apart in order to provide access for a suitable handling device for the removal of the substrates.

Figure 4:
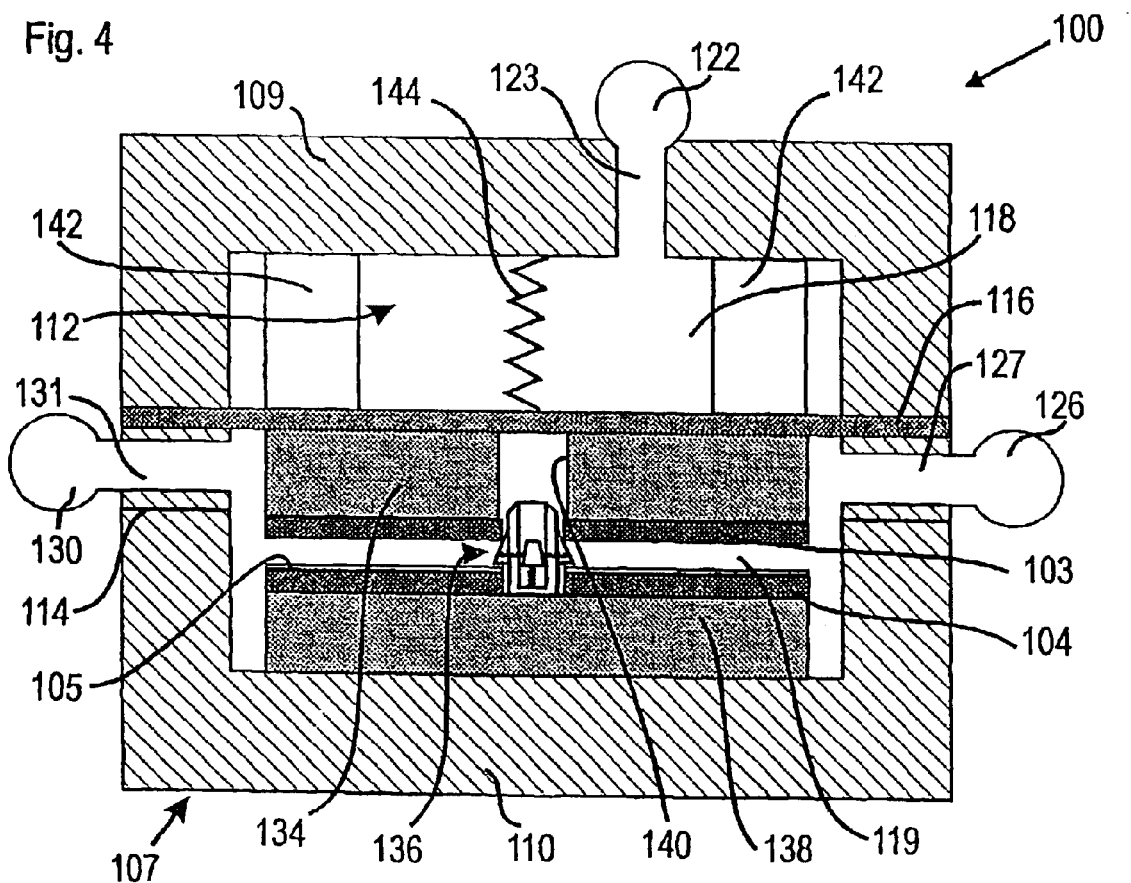
FIG. 4 a schematic illustration of an alternative embodiment of an apparatus for the joining of substrates together.

FIG. 4 shows an alternative embodiment of the invention. FIG. 4 shows an apparatus 100 for the joining together of two substrates 103, 104 that have an inner hole and that—as with the first embodiment—form, for example, a CD or DVD or some other data carrier. In order during the joining together of the substrates 103, 104 to ensure a gluing together thereof, there is applied to the substrate 104 an adhesive 105 in the form of a double-sided adhesive film.

The apparatus 100 has a housing 107 that is formed of two housing portions 109, 110 that are movable relative to one another and that—as in the first embodiment—each have an essentially U-shaped cross-section. In a moved-together state, the two housing portions 109, 110 formed between them a chamber 112 that is sealed relative to the surroundings at an interface 114 between the two housing portions 109, 110.

Provided in the upper housing portion 109 is a flexible membrane 116 that completely spans the inner region of the housing portion 109 and in so doing divides the chamber 112 formed between the housing portions 109, 110 into an upper chamber portion 118 and a lower chamber portion 119.

The upper chamber portion 118 can be supplied with underpressure via a vacuum source 122, such as a vacuum pump, and an appropriate conduit 123 in the upper housing portion 109. In a comparable manner, the lower chamber portion 119 can be supplied with underpressure via a vacuum source 126 and an appropriate conduit 127 in the upper housing portion 109. The upper chamber portion 118 can furthermore be supplied with pressure via a pressure source, such as a pump 130, and an appropriate conduit 131 in the upper housing portion 109.

A plate 134 is mounted in a suitable manner to the membrane 116 and faces the lower chamber portion 119, so that the plate 134 is movable with the flexible membrane 116.

Provided on the lower housing portion 110 is a lower plate 138 that is disposed opposite the plate 134 and on which is mounted a centering pin 136. The centering pin 136 has the same construction as does the centering pin 36 of the first embodiment. The upper plate 134, which is mounted on the membrane 116, has a central opening 140 into which the centering pin 136 can move during a movement of the upper plate 134 toward the lower plate 138.

Provided in the upper chamber 118 are abutment or support means 142 in order to limit an upward movement, i.e. into the chamber 118, of the membrane 116 and the plate 134 mounted thereon.

By means of a spring 144, which extends between the upper housing portion 109 and the membrane 116, the membrane 116 is preloaded against the abutment or support means 142. The force of the spring 144 is designed such that upon pressure equalization in the chambers 118 and 119, the spring lightly draws the membrane against the support means 142 in order to hold the membrane 116, and the plate 134 mounted thereon, in the position shown in FIG. 4. Of course, some other preloading device can also be provided in order to preload the plates away from one another.

The operation of the apparatus 100 of FIG. 4 is essentially the same as with the first embodiment, whereby, however, with the embodiment of FIG. 4 there is first produced an underpressure in the upper chamber 118 and subsequently in the lower chamber 119 in order to avoid an uncontrolled joining together of the substrates 103, 104.

A primary difference between the embodiments illustrated in FIGS. 1 and 4 is that with the embodiment of FIG. 4, the plate mounted on the membrane is disposed above the plate that is rigidly mounted on the housing. Furthermore, the vacuum pumps 122, 126, as well as the pressure pump 130, are connected with appropriate conduits 123, 127, 131, which are all provided in the upper housing portion 109. Thus, in the lower housing portion 110 no conduits are formed that communicate with a pump or vacuum pump.

The lower housing portion 110 can therefore be embodied in a straightforward and economical manner as part of a rotary switching or indexing table that provides a plurality of these lower housing portions 110. The upper housing portion 109 can therefore be utilized for a plurality of lower housing portions 110, thereby increasing the throughput of the apparatus, since the loading and removal of the substrates can be effected beyond the region of the upper housing portion 109.

Although this is not illustrated in the figures, the plates 134, 138 can have suitable surface structures, such as grooves, that face the substrates 103, 104 and via which, for example, compressed air can be applied to the substrates in order to press them together. Such structures, which enable a pressing of the substrates together by direct application of compressed air to the substrates, are already described in the aforementioned DE 199 27 516.5, which to this extent is made the subject matter of this application in order to avoid repetition.

The present invention was described with reference to preferred embodiments, without, however, being limited to the concretely illustrated embodiments. For example, the shape of the housing can deviate from the illustrated housing shapes. In particular with the embodiment of FIG. 4, it is also possible to make the lower housing portion 110 flat, while the legs of the U-shape of the upper housing portion are lengthened. The plate then enables a sealing with the upper housing portion 109 to form upper and lower chambers. Furthermore, features of one embodiment can also be utilized in the other embodiment to the extent that these features are compatible. It is also possible to provide only one chamber to produce a pressure difference on opposite sides of the membrane. For example, it could suffice to supply underpressure to one of the plates and the chamber that receives the substrates. To prevent an uncontrolled joining together of the substrates prior to reaching a prescribed pressure in the chamber, the membrane can, for example via a spring, an electromagnet, or some other holding device, be held in a position in which the plates are spaced from one another.

The specification incorporates by reference the disclosure of German priority document 101 00 426.5 filed 08 Jan. 2001 and PCT/EP01 /14660 filed 13 Dec. 2001.

The present invention is, of course, in no way restricted to the specific disclosure of the specification and drawings, but also encompasses any modifications within the scope of the appended claims.

What is claimed is:

1. A method of joining at least two substrates together for forming an optical data carrier, including the steps of:

disposing the at least two substrates to be joined in a spaced-apart manner between two plates that are disposed opposite from, and are movable relative to, one another, wherein one of said plates is connected to a flexible membrane and is freely movable therewith; and moving at least the plate which is connected to said flexible membrane towards the other plate by producing a pressure difference on opposite sides of the membrane to thereby join the substrates together.

2. A method according to claim 1, wherein the substrates, prior to being joined together, are held spaced from one another by a centering pin that engages in an inner hole of the substrates.

3. A method according to claim 1, including the further step of applying an underpressure in a first chamber that surrounds said plates, wherein a wall of said first chamber is formed at least partially by said membrane.

4. A method according to claim 3, wherein after a joining of the substrates together, the first chamber is supplied with pressure.

5. A method according to claim 3, which includes the further step of applying an underpressure in a second chamber that is disposed on a side of said membrane that faces away from said plates.

6. A method according to claim 5, wherein prior to a joining of said substrates together, a pressure in said second chamber is held below a pressure in said first chamber.

7. A method according to claim 6, wherein the pressure in said second chamber is brought to ambient pressure prior to a joining of the substrates together, while the pressure in the first chamber is held at an underpressure.

* * * * *

UNITED STATES PATENT AND TRADEMARK OFFICE
CERTIFICATE OF CORRECTION

PATENT NO.    : 6,953,514 B2
DATED         : October 11, 2005
INVENTOR(S)   : Speer et al.

It is certified that error appears in the above-identified patent and that said Letters Patent is hereby corrected as shown below:

Title page,
Item [54], Title, should read as follows:
-- [54] Title: METHOD AND APPARATUS FOR JOINING SUBSTRATES TOGETHER --.

Signed and Sealed this

Thirteenth Day of December, 2005

JON W. DUDAS
*Director of the United States Patent and Trademark Office*